(12) United States Patent
Kamil et al.

(10) Patent No.: US 9,469,192 B2
(45) Date of Patent: Oct. 18, 2016

(54) DIFFERENTIAL ASSEMBLY AND METHOD

(71) Applicant: REGO VEHICLES LTD., MP Upper Galil (IL)

(72) Inventors: Ami Kamil, Be'erotayim (IL); Izik Mini, Rosh Pina (IL)

(73) Assignee: REGO VEHICLES LTD., MP Upper Galil (IL)

(*) Notice: Subject to any disclaimer, the term of this patent is extended or adjusted under 35 U.S.C. 154(b) by 0 days.

(21) Appl. No.: 14/761,411

(22) PCT Filed: Dec. 22, 2014

(86) PCT No.: PCT/IL2014/051116
§ 371 (c)(1),
(2) Date: Jul. 16, 2015

(87) PCT Pub. No.: WO2015/097695
PCT Pub. Date: Jul. 2, 2015

(65) Prior Publication Data
US 2015/0360562 A1 Dec. 17, 2015

Related U.S. Application Data

(60) Provisional application No. 61/919,828, filed on Dec. 23, 2013.

(51) Int. Cl.
*B60K 17/32* (2006.01)
*B60K 17/16* (2006.01)
(Continued)

(52) U.S. Cl.
CPC .......... *B60K 17/32* (2013.01); *B60G 3/00* (2013.01); *B60K 17/16* (2013.01); *F16H 48/00* (2013.01)

(58) Field of Classification Search
CPC ........ B60K 17/32; B60K 17/16; B60G 3/00; F16H 48/00
See application file for complete search history.

(56) References Cited

U.S. PATENT DOCUMENTS

| 2,720,797 A | * | 10/1955 | Huddleston | B60K 17/16 475/230 |
| 5,353,988 A | | 10/1994 | Gallenberg | |

(Continued)

FOREIGN PATENT DOCUMENTS

GB 705114 3/1954

OTHER PUBLICATIONS

International Search Report and Written Opinion of the International Searching Authority mailed Apr. 2, 2015 for PCT/IL2014/051116.

(Continued)

*Primary Examiner* — Faye M Fleming
(74) *Attorney, Agent, or Firm* — Paul D. Bianco; Katharine Davis; Fleit Gibbons Gutman Bongini & Bianco PL

(57) ABSTRACT

A vehicle differential inversion assembly for splitting the torque of the vehicle power source two ways to opposite sides of the vehicle, to a set of wheels; a left wheel and a right wheel. The wheels are supported by respective independent left and right suspensions allowing vertical travel of each wheel. The assembly features a differential module for splitting the torque two ways. The differential module is disposed between the left wheel and the right wheel and has a left side output and a right side output. The outputs spin at opposed directions. A left output axle couples with the left side output and extends to the left of the differential module. A right output axle couples with the right side output and extends to the right of the differential module. A left wheel axle is cross-coupled with the right output axle by a right inversion joint disposed at a distance to the right of the differential module. The left wheel axle extends toward and turns the left wheel. A right wheel axle is cross-coupled with the left output axle by a left inversion joint disposed at a distance to the left of the differential module. The right wheel axle extends toward and turns the right wheel. The right inversion joint and the left inversion joint provide for angular articulation of the left wheel axle and the right wheel axle, respectively, thereby allowing the vertical travel of each wheel.

14 Claims, 6 Drawing Sheets

(51) Int. Cl.
   *F16H 48/00*   (2012.01)
   *B60G 3/00*    (2006.01)

(56) References Cited

U.S. PATENT DOCUMENTS

| | | | | |
|---|---|---|---|---|
| 5,910,060 A * | 6/1999 | Blume | ............... | B60K 17/04 |
| | | | | 475/221 |
| 6,007,453 A * | 12/1999 | Ohkuma | ............ | B60K 23/04 |
| | | | | 475/117 |
| 6,033,337 A * | 3/2000 | Ohkuma | ............ | B60K 23/04 |
| | | | | 475/19 |
| 6,203,039 B1 | 3/2001 | Gorden | | |
| 2005/0209761 A1* | 9/2005 | Elie | ............... | B60K 17/16 |
| | | | | 701/67 |
| 2006/0079369 A1* | 4/2006 | Mohan | ............... | B60K 17/16 |
| | | | | 475/221 |
| 2007/0155576 A1* | 7/2007 | Shapiro | ............... | B60K 17/16 |
| | | | | 475/221 |
| 2008/0207363 A1* | 8/2008 | Maguire | ............... | B60K 17/16 |
| | | | | 474/8 |
| 2009/0054202 A1* | 2/2009 | Yamakado | ............ | B60K 6/48 |
| | | | | 477/6 |
| 2009/0160274 A1* | 6/2009 | Aikawa | ............... | B60K 1/00 |
| | | | | 310/83 |
| 2010/0075796 A1* | 3/2010 | Nehse | ............... | B60K 17/16 |
| | | | | 475/220 |
| 2015/0126320 A1* | 5/2015 | Genise | ............... | B60K 17/08 |
| | | | | 475/199 |

OTHER PUBLICATIONS http://www.proformance.com.au/ifs_irs_integral_diff.html; Proformance; Dec. 31, 2002; 2 pages.

* cited by examiner

DIFFERENTIAL ASSEMBLY AND METHOD

FIELD OF THE DISCLOSED TECHNIQUE

The disclosed technique generally relates to vehicle suspension for front and rear wheel drives, and more particularly, to a differential assembly adapted for deployment in conjunction with the vehicle suspension and chassis.

BACKGROUND OF THE DISCLOSED TECHNIQUE

The suspension system of a vehicle (such as, a car, a truck, a motorcycle, or other wheeled vehicle) is the part of the chassis that supports the vehicle's frame, on which the vehicle's engine and body weight are carried. The vehicle's suspension system is required for absorbing and dampening shocks and maintaining the wheels in contact with the road. Suspension systems are designed to provide good riding dynamics, which are required to ensure vehicle safety and passenger comfort. These riding dynamics include road isolation, i.e., the vehicle's ability to smooth out travel on a bumpy road, as well as its ability to safely accelerate, brake and corner. For vehicles that are built specifically to handle on-road and off-road travel conditions, independent suspension of the wheels, which allows each individual wheel to move independently of the other wheels, is often used for better performance (in comparison to dependent suspension that has a rigid axle that connects a pair of opposed wheels, either the front wheels or the rear wheels). 'Movement' of the wheel in this context relates to vertical travel of the wheel relative to the vehicle frame. An engine or power source may be used to rotate one or more of the wheels, depending if the vehicle has front wheel drive, rear wheel drive, or four wheel drive. Typically, each set or pair of the driven wheels (front, rear, or both, respectively), receives the driving torque from the engine or power source via a drive shaft, which is split two ways by a differential, allowing each output axle to spin at a different speed. The differential is conventionally disposed in the middle, or offset from the middle (rearwardly, forwardly, upwardly, downwardly), between the opposite wheels. Two wheel axles extend from opposite sides of the differential towards the wheel hubs. The wheels, or wheel hubs, are typically supported by suspension arms, or equivalent mechanisms that allow vertical wheel travel, with suitable shock-absorbing and dampening features to complement the suspension performance. The length of the vertical travel of the wheel determines the inherent maximal performance of the wheel suspension mechanism. The greater the vertical travel of the wheel, the greater its maximal performance of its suspension capabilities. Extension of vertical wheel travel can improve, among other things, technical handling of the vehicle in off road drive by extending the time the wheels touch the ground, and extending the range of shock absorption, causing the work of the shock absorbers to be more gradual. However, as the driving torque is conveyed through the driving axle which extends from the differential to the wheel, and since the angular articulation of the wheel axle is limited, it is the length of the wheel axle that often determines to a great degree the maximal vertical wheel travel. Accordingly, longer wheel axles would provide greater vertical travel of the wheel.

One example of an attempt to provide longer wheel axles can be found at the website of PROFORMANCE® Motorsports, a differential carrier of PROFORMANCE® ultra narrow differentials into which internal CV (continuous velocity) joints of the opposed wheel axles are fitted deep inside, where the CV joint faces are only 40 mm apart.

SUMMARY OF THE DISCLOSED TECHNIQUE

In accordance with one aspect of the disclosed technique, there is thus provided a vehicle differential inversion assembly for splitting the torque of the vehicle power source two ways to opposite sides of the vehicle, to a set of wheels; a left wheel and a right wheel. The wheels are supported by respective independent left and right suspensions allowing vertical travel of each wheel. The assembly features a differential module for splitting the torque two ways. The differential module is disposed between the left wheel and the right wheel and has a left side output and a right side output. The outputs spin at opposed directions. A left output axle couples with the left side output and extends to the left of the differential module. A right output axle couples with the right side output and extends to the right of the differential module. A left wheel axle is cross-coupled with the right output axle by a right inversion joint disposed at a distance to the right of the differential module. The left wheel axle extends toward and turns the left wheel. A right wheel axle is cross-coupled with the left output axle by a left inversion joint disposed at a distance to the left of the differential module. The right wheel axle extends toward and turns the right wheel. The right inversion joint and the left inversion joint provide for angular articulation of the left wheel axle and the right wheel axle, respectively, thereby allowing the vertical travel of each wheel.

Optionally, the left inversion joint and the right inversion joint may feature continuous velocity rotation (CV) joints. Similarly, the left side output and right side output may have CV joints.

Further optionally, one of the left side output and right side output is longitudinally displaced toward the rear or the front of the vehicle with respect to the other one of the left side output and right side output. Alternatively, one of the left inversion joint and right inversion joint is longitudinally displaced toward the rear or the front of the vehicle with respect to the other one of the left inversion joint and right inversion joint. Further alternatively, the left output axle and right output axle extend at opposing lateral angular displacements such that the right inversion joint and the left inversion joint are longitudinally displaced with respect to one another. The right wheel axle and the left wheel axle may be disposed at opposing lateral angular displacements, for compensating the longitudinal displacement of the side outputs, output axles, or inversion joints, such that the set of wheels are positioned on the same longitudinal disposition in parallel on the same traverse axis.

The CV joint may be a universal joint, a Tracta joint, a Rzeppa joint, a Weiss joint, a Tripod joint, a double Cardan joint, a Thompson coupling (Thompson constant velocity joint—TCVJ), and a Malpezzi joint.

The differential module can be an open differential, a limited slip differential (LSD) [positraction], a clutch-type LSD, a viscous coupling, a locking differential, or a TORSEN® differential (torque-sensing limited slip differential (LSD)).

In accordance with another aspect of the disclosed technique, there is thus provided a method for increasing vertical wheel travel for a vehicle having a set of wheels; a left wheel and a right wheel, the wheels being driven by the power source of the vehicle and supported by respective independent left and right suspensions allowing vertical travel of each wheel. The method includes splitting the torque of the vehicle power source two ways to opposite sides of the vehicle, to the set of a left wheel and a right wheel, utilizing a differential module disposed between the left wheel and the right wheel, the differential module having a left side output and a right side output, the outputs spinning at opposed directions. The method further includes coupling a left output axle with the left side output, the left output axle extends to the left of the differential module, and coupling a right output axle with the right side output, the right output axle extends to the right of the differential module. The method further includes cross-coupling a left wheel axle with the right output axle by a right inversion joint at a distance to the right of the differential module, the left wheel axle extends towards and turns the left wheel, and cross-coupling a right wheel axle with the left output axle by a left inversion joint at a distance to the left of the differential module, the right wheel axle extends towards and turns the right wheel. The method further includes providing angular articulation, by the right inversion joint and the left inversion joint, to the left wheel axle and the right wheel axle, respectively, thereby allowing vertical travel of each wheel.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The disclosed technique overcomes the disadvantages of the prior art by providing a vehicle differential inversion assembly for splitting the torque of the vehicle's power source two ways to opposite sides of the vehicle, to a set of wheels, a left wheel and a right wheel, supported by respective independent left and right suspensions allowing vertical travel of each wheel. The assembly includes a differential module for splitting the torque two ways, featuring output axles extending to both the left and right sides of the differential module. Wheel axles are cross-coupled with the output axles by inversion joints disposed at a distance from the differential module. These wheel axles are longer than conventional wheel axles. The inversion joints provide angular articulation of the wheel axles, thereby allowing the vertical travel of each wheel. As the wheel axles are longer than conventional axles the vertical travel of the wheels provided by the angular articulation of the disclosed technique exceeds that of conventional systems featuring similar angular articulation.

Figure 1:
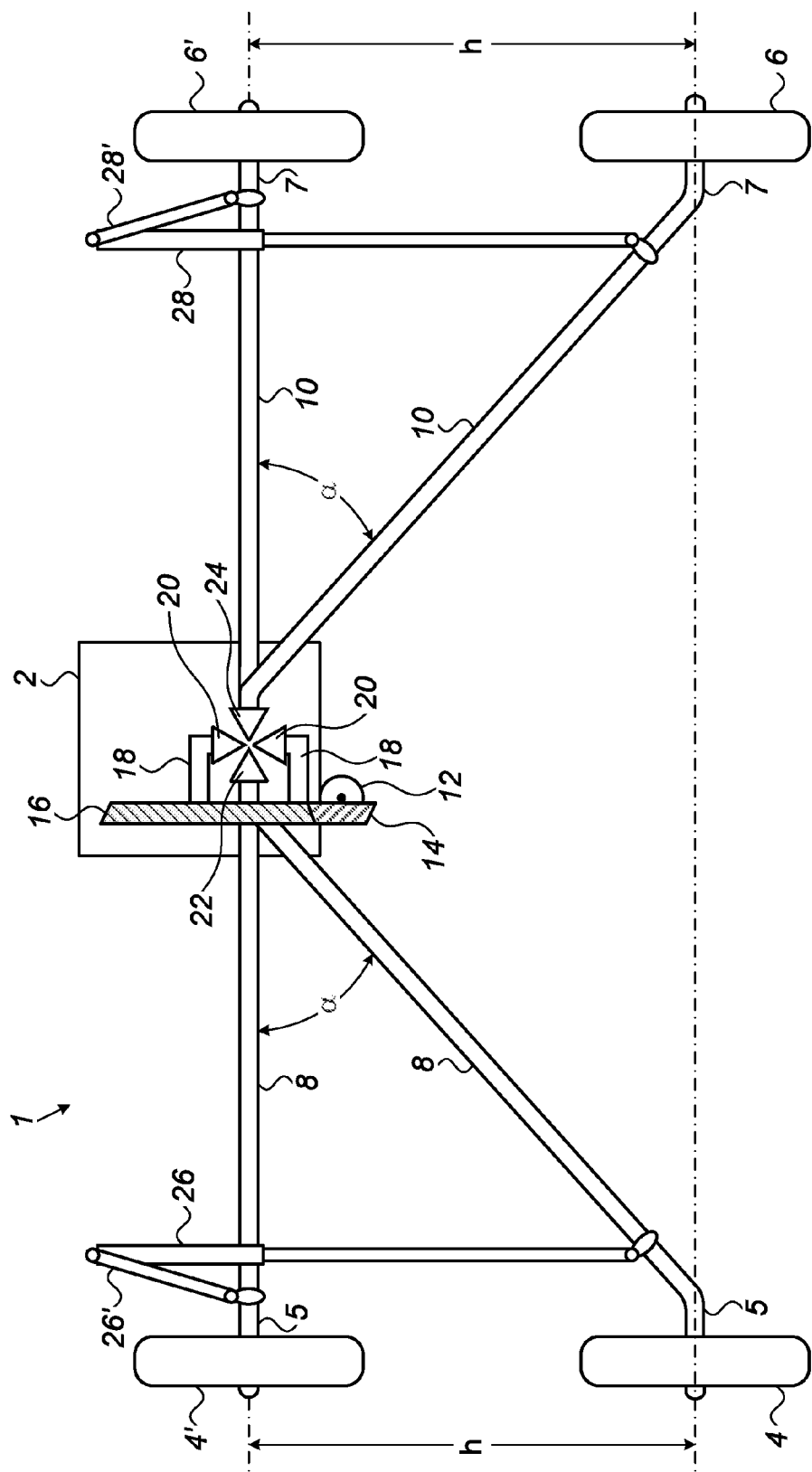
FIG. 1 is a cross-sectional schematic illustration of a front (or rear) view of a conventional prior art differential arrangement.

Reference is now made to FIG. 1, which is a cross-sectional schematic illustration of a front (or rear) view of a conventional prior art differential arrangement 1. Differential arrangement 1 includes differential 2, left wheel 4, right wheel 6, left wheel axle 8, and right wheel axle 10. A differential is a device that splits the engine torque two separate ways, allowing each output to spin at a different speed, at least some of the time. For the sake of clarity, differential 1 can be described as a simple open differential, receiving engine torque from a shaft 12 via input pinion 14 that turns differential ring gear 16. Ring gear 16 includes cage 18 with pinion gears 20 that are coupled to left side gear 22, which spins left axle shaft 8, and to right side gear 24, which spins right axle shaft 10. Wheels 4 and 6 usually connect to axles 8 and 10 by continuous velocity (CV) joints 5 and 7, respectively, which maintain wheels 4 and 6 in a vertical angle relative to the ground, and allow axles 8 and 10 to change length as they travel up and down. Wheels 4 and 6 are free to travel vertically between top positions represented by wheels 4', 6' and bottom positions represented by wheels 4, 6. Independent suspension mechanisms 26 and 28, for example, MacPherson struts, are shown in their expanded positions which keep wheels 4 and 6 in their bottom positions. Independent suspension mechanisms 26 and 28 are also shown in their contracted positions represented by struts 26', 28', when wheels 4 and 6 are in their top positions. The freedom of vertical travel of wheels 4, 6, is confined within the boundaries by which wheel axles 8, 10 can pivot upwards and downwards. This vertical travel is defined by the length of wheel axles 8, 10 and the angular articulation of wheel axles 8, 10 designated by angle α. The length of wheel axles 8, 10 is dictated by the width of the vehicle and whether differential 2 is disposed right in between wheels 4, 6 or in offset. As wheel axles 8, 10 must connect to differential 2 at all times, with torque continuously delivered from spinning pinion gears 20 to side gears 22, 24, the angular articulation of wheel axles 8, 10 is limited to this angle α. Enlargement of angle α requires massive modifications to the torque delivery mechanisms from differential 2 to wheels 4, 6. [Such modifications are prone to entail substantial implications regarding performance and safety of the vehicle (e.g., adversely impacting axle or final drive ratio), thereby involving complicated solutions to make up for such implications. It is an object of the disclosed technique to provide a solution to the problem of enlarging, increasing, and expanding the limits of vertical wheel travel, without compromising vehicle performance and safety or requiring complicated modifications.

Figure 2:
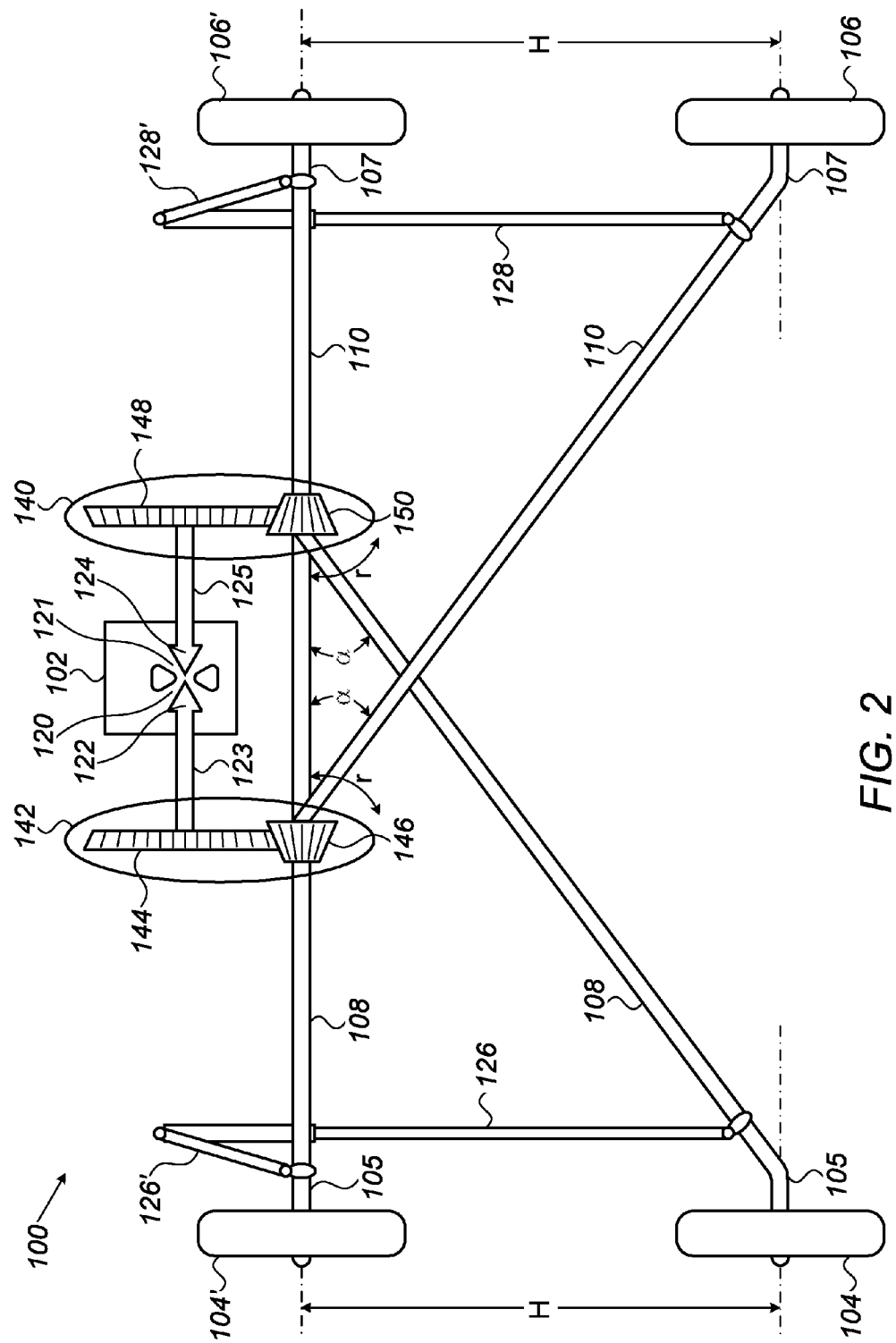
FIG. 2 is a cross-sectional schematic illustration of a front (or rear) view of a differential inversion assembly, constructed and operative in accordance with an embodiment of the disclosed technique.

Reference is now made to FIG. 2, which is a cross-sectional schematic illustration of a front (or rear) view of differential inversion assembly 100, constructed and operative in accordance with an embodiment of the disclosed technique. Differential assembly 100 is installed in a vehicle, and configured to split the torque of the vehicle power source (not shown) two ways to opposite sides of the vehicle, to a set of wheels, left wheel 104 and right wheel 106. In this context, differential assembly 100 is intended for installing in a vehicle requiring the transmission of torque to a pair of wheels, such as, a vehicle with front wheel drive and/or rear wheel drive. The vehicle may be, for example: a passenger car, a four wheel drive car, an off-road car, a truck, a civilian, security, agricultural or military vehicle, a cross country sports car, and the like. The power source may be any suitable known source, such as a combustion engine, an electric motor, or a hybrid power arrangement. Wheels 104, 106 are supported by respective independent left and right suspensions, denoted 126, 128, respectively. The term "independent" designates the ability of each suspension 126, 128, to independently allow vertical travel of its respective wheel 104 or 106, irrespective of the vertical position or travel of the other wheel (104 or 106) or the other suspension. Suspensions 126, 128 are shown in FIG. 2 as resembling MacPherson struts, but are not limited thereto, and may include any other known shock absorbers, struts and components, such as: coil springs, leaf springs, torsion bars, dampening structures, anti-sway bars, double-wishbone, split wishbone, multi-rod, multi-link or four-bar suspension, BOSE® Suspension Module (uses linear electromagnetic motors (LEM) at each wheel), and the like.

Suspensions 126, 128 allow vertical travel of each wheel 104, 106, between a bottommost position in which the wheels are denoted 104, 106, and a topmost position denoted by 104', 106'. Suspensions 126, 128 are also shown in their contracted position 126', and 128', conforming to the uppermost positioning of wheels 104', 106', while the expanded configuration of suspensions 126, 128 conforms to the lowermost positioning of wheels, designated as 104, 106. CV Joints 105 and 107 connect wheels 104 and 106 to axles 108 and 110, respectively, for maintaining wheels 104 and 106 in a substantially constant vertical angle relative to the ground, and allow axles 108 and 110 to change length (or joints 105 and 107 change their own length) as wheels 104 and 106 travel up and down and change positions vertically.

Differential inversion assembly 100 further includes differential module 102, for splitting the torque two ways, left and right. Differential module 102 is disposed between left wheel 104 and right wheel 106. Differential module 102 includes a left side output 120 and a right side output 121. Outputs 120, 121 spin at opposed directions, respectively. Differential module 102 can include, in addition to an open differential that can incorporate other structures, alternative differentials of any known type, such as: a limited slip differential (LSD) or positraction, a clutch-type LSD, a viscous coupling, a locking differential, and a TORSEN® differential (torque-sensing limited slip differential (LSD)).

Differential inversion assembly 100 further includes left output axle 123, which is coupled with left side output 120 and extends to the left of differential module 102. Similarly, a right output axle 125 is coupled with right side output 121 and extends to the right of differential module 102. Differential module 102 can feature, for example, a simple open differential similar to differential 2 of FIG. 1, wherein pinion gears similar to pinion gears 20 of FIG. 1 provide two interfaces, one on the left side and one on the right side. The left side pinion is suitable for delivering torque to left side gear 122 of output axle 123, and the right side pinion is suitable for delivering torque to right side gear 124 of output axle 125.

Differential inversion assembly 100 further includes left wheel axle 108 which is cross-coupled with right output axle 125 by right inversion joint 140 disposed at a distance to the right of differential module 102. Left wheel axle 108 extends towards and turns left wheel 104. Similarly, right wheel axle 110 is cross-coupled with left output axle 123 by left inversion joint 142 disposed at a distance to the left of differential module 102. Right wheel axle 110 extends towards and turns right wheel 106. This arrangement requires and provides for longer wheel axles than are conventionally used, as apparent when comparing conventional wheel axles 8 and 10 of FIG. 1 to wheel axles 108 and 110 of the embodiment of FIG. 2.

The advantage of these longer axles is materialized when wheel axles 108 and 110 are provided with angular articulation functionally similar to that of wheel axles 8 and 10 of FIG. 1. To this end, right inversion joint 140 and left inversion joint 142 provide for angular articulation of left wheel axle 108 and right wheel axle 110, respectively, thereby allowing the vertical travel of each wheel between the lowermost positions designated by wheels 104, 106, and the uppermost positions designated by wheels 104', 106'. The vertical travel H of wheels 104, 106 of FIG. 2, is longer than the vertical travel h of wheels 4, 6 of FIG. 1, for a given articulation angle α in both cases.

Delivery of torque from left output axle 123 to right wheel axle 110, while inverting direction of torque conveyance and maintaining angular articulation for right wheel axle 110, can be provided by a variety of designs at left inversion joint 142. For example, a toothed sprocket wheel 144 of left output axle 123, with adequately tapered teeth and gaps (similar to ring gear 16 or pinion gears 20 of FIG. 1), can accommodate a right side gear 146 (similar to side gears 22 and 24), while allowing pivoting of right side gear 146 in direction r. A symmetrical design at right inversion joint 140 includes a toothed sprocket wheel 148 of right output axle 125 accommodating a left side gear 150. Alternative designs for inversion joints 140 and 142 can include continuous velocity rotation (CV) joints. CV joints (a.k.a., "homokinetic joints") allow a drive shaft to transmit power through a variable angle, at constant rotational speed, without an appreciable increase in friction or play. Left side output 120 and right side output 121 may also include CV joints, for adding further angular articulation. Examples of CV joints which can be used for such tasks can be one of: a universal joint, a Tracta joint, a Rzeppa joint, a Weiss joint, a Tripod joint, a double Cardan joint, a Thompson coupling (Thompson constant velocity joint—TCVJ), and a Malpezzi joint.

Figure 3:
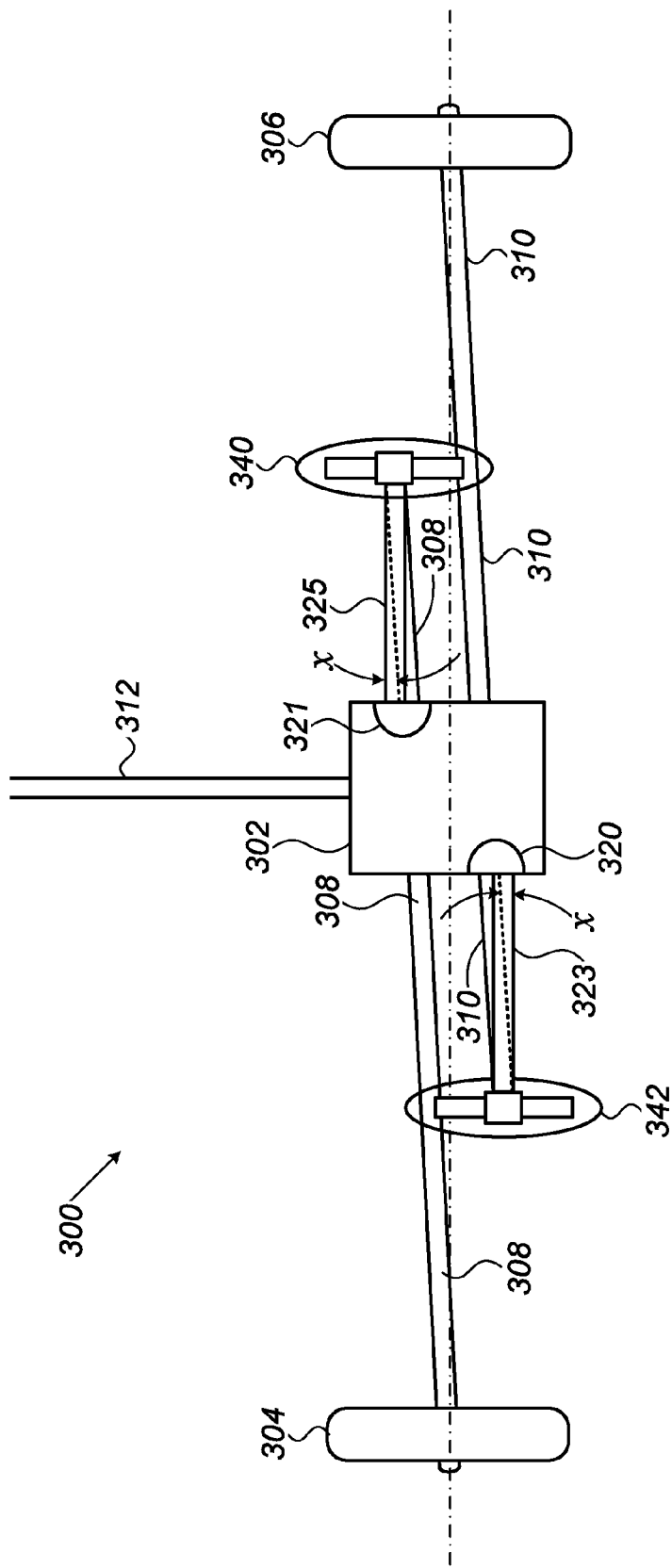
FIG. 3 is a schematic illustration of a top view of a differential inversion assembly, constructed and operative in accordance with another embodiment of the disclosed technique.
Figure 4:
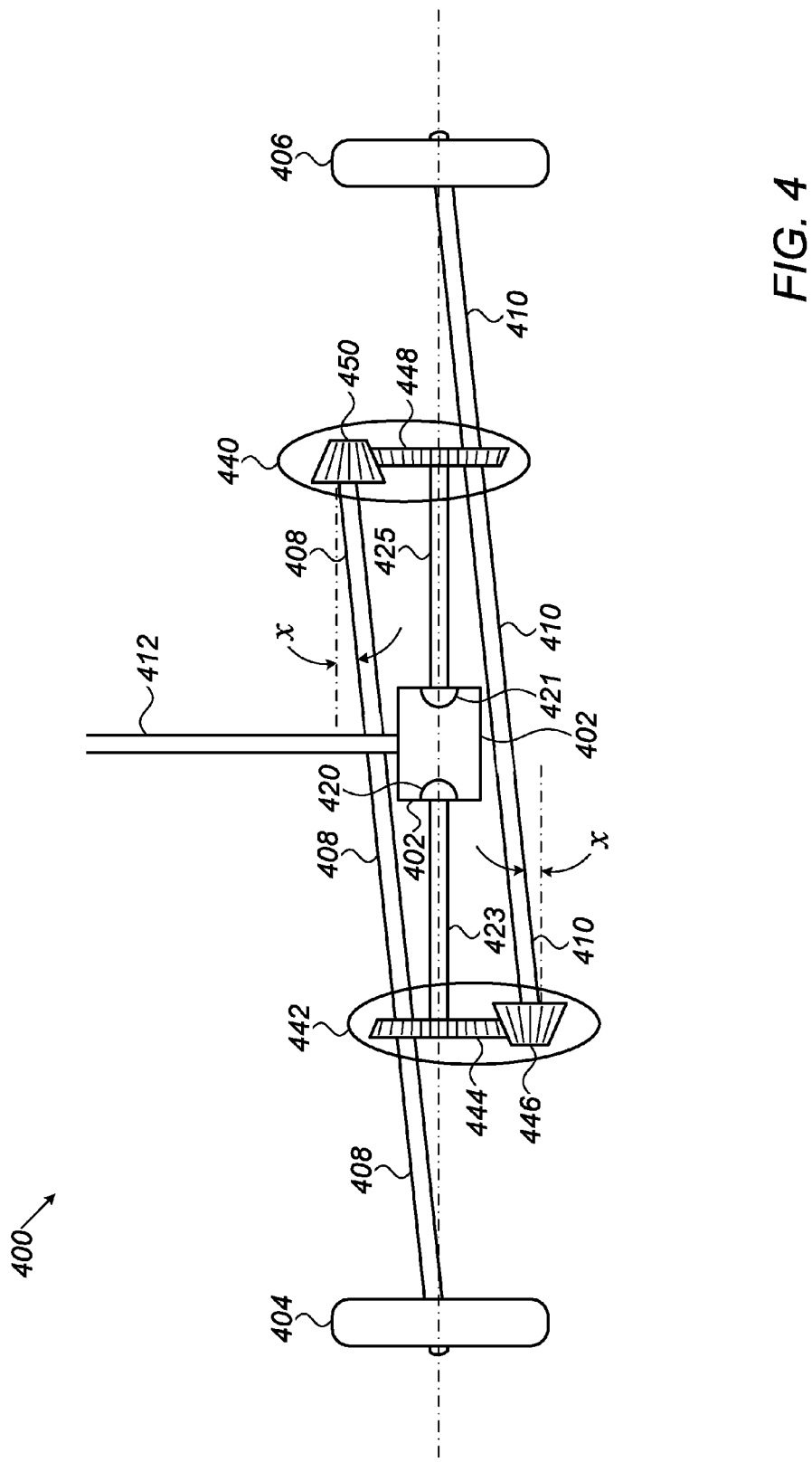
FIG. 4 is a schematic illustration of a top view of a differential inversion assembly, constructed and operative in accordance with a further embodiment of the disclosed technique.
Figure 5:
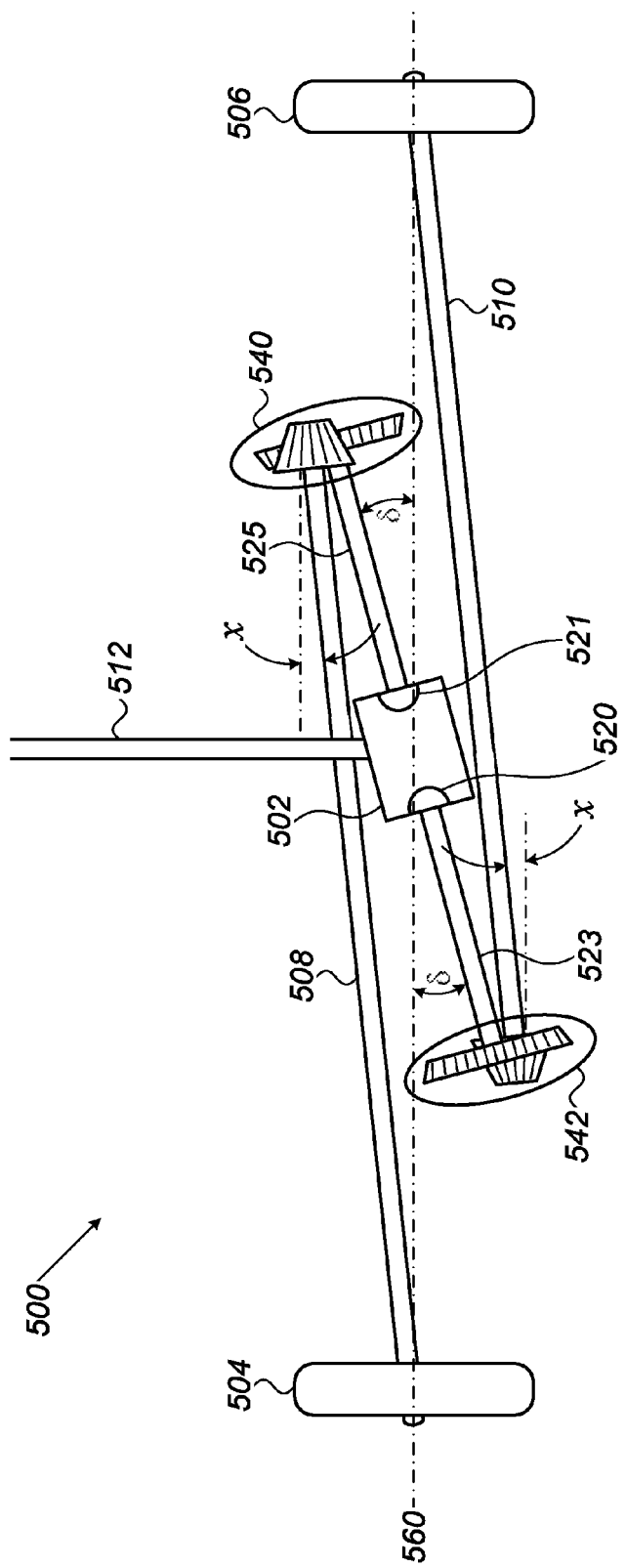
FIG. 5 is a schematic illustration of a top view of a differential inversion assembly, constructed and operative in accordance with yet a further embodiment of the disclosed technique.

Reference is now made to FIGS. 3, 4 and 5, which illustrate alternative designs addressed to provide longitudinal displacement between the right hand side wheel axle and the left hand side wheel axle, which cannot cross each other and must be distanced with respect to one another, for whatever angular position they assume. It is also significant to maintain the left and right wheels aligned with one another, as if they are substantially disposed on the same axis, for the vehicle's stability and performance.

FIG. 3 is a schematic illustration of a top view of a differential inversion assembly 300, constructed and operative in accordance with another embodiment of the disclosed technique. Differential inversion assembly 300 includes a differential 302 which receives engine torque from shaft 312. However, left side output 320 is longitudinally displaced rearward while right side output 321 is longitudinally displaced forwards, such that left output axle 323 is longitudinally displaced with respect to right output axle 325. Alternatively, the displacements can be made in the opposite, reverse directions, namely, a longitudinal displacement of left side output 320 (and left output axle 323) forwards with respect to right side output 321 (and left output axle 325). As a result of such displacement, left wheel axle 308 and right wheel axle 310 can freely pivot upwards and downwards without physically contacting each other, as they always assume a different spatial positioning from one another.

As mentioned above, it may be important to maintain wheels 304 and 306 in parallel on the same traverse axis. To this end, right wheel axle 310 and left wheel axle 308 can be disposed at opposing lateral angular displacements $\chi$, which compensate for the longitudinal displacement of side outputs 320 and 321, output axles 323 and 325, and inversion joints 340 and 342, such that the set of right wheel 306 and left wheel 304 are positioned on the same longitudinal disposition, in parallel on the same traverse axis relative to the vehicle on which they are disposed.

FIG. 4 is a schematic illustration of a top view of a differential inversion assembly 400, constructed and operative in accordance with a further embodiment of the disclosed technique. In the embodiment of FIG. 4, only the left inversion joint and/or right inversion joint is longitudinally displaced toward the rear or the front of the vehicle with respect to the other inversion joint, right or left, while the differential outputs and the output axles remain, displacement-wise, on the same axis.

Differential inversion assembly 400 includes a differential 402 which receives engine torque from shaft 412. Differential left side output 420 and right side output 421, as well as output axles 423 and 425, are aligned on the same axis. However, left inversion joint 442 is longitudinally displaced rearward while right inversion joint 440 is longitudinally displaced forwards, such that left wheel axle 408 is longitudinally displaced with respect to right wheel axle 410. Alternatively, the displacements can be made in the opposite, reverse directions, namely, a longitudinal displacement of left inversion joint 442 (and right wheel axle 410) forwards with respect to right inversion joint 440 (and right wheel axle 408). As a result of such displacement left wheel axle 408 and right wheel axle 410 can freely pivot upwards and downwards without physically contacting each other, as they always assume a different spatial positioning from one another.

For maintaining wheels 404 and 406 in parallel on the same traverse axis, right wheel axle 410 and left wheel axle 408 can be disposed at opposing lateral angular displacements $\chi$, which compensate for the longitudinal displacement of inversion joints 440 and 422, such that the set of right wheel 406 and left wheel 404 are positioned on the same longitudinal disposition, in parallel on the same traverse axis relative to the vehicle on which they're disposed.

FIG. 5 is a schematic illustration of a top view of a differential inversion assembly 500, constructed and operative in accordance with yet a further embodiment of the disclosed technique. FIG. 5 exemplifies an embodiment in which the left output axle and right output axle extend at opposing lateral angular displacements, such that the right inversion joint and the left inversion joint are longitudinally displaced with respect to one another.

Differential inversion assembly 500 includes a differential 502 which receives engine torque from shaft 512. Differential left side output 520 and right side output 521, as well as left output axle 523 and right output axle 525, are aligned on the same axis. However, this axis is angularly displaced at an angle $\delta$ with respect to the traverse axis 560 on which wheels 504 and 506 should be positioned. As a result, left output axle 523 and right output axle 525 extend at opposing lateral angular displacements $\delta$, such that right inversion joint 540 and left inversion joint 542 are longitudinally displaced with respect to one another.

Left inversion joint 542 is longitudinally displaced rearward while right inversion joint 540 is longitudinally displaced forwards, such that left wheel axle 508 is longitudinally displaced with respect to right wheel axle 510. Alternatively, the displacements can be made in the opposite, reverse directions, namely, a longitudinal displacement of left inversion joint 542 (and right wheel axle 510) forwards with respect to right inversion joint 540 (and left wheel axle 508). As a result of such displacements, left wheel axle 508 and right wheel axle 510 can freely pivot upwards and downwards without physically contacting each other, as they always assume a different spatial positioning from one another.

For maintaining wheels 504 and 506 in parallel on the same traverse axis 560, right wheel axle 510 and left wheel axle 508 can be disposed at opposing lateral angular displacements $\chi$, which compensate for the longitudinal displacement of inversion joints 540 and 542, such that the set of right wheel 506 and left wheel 504 are positioned on the same longitudinal disposition, in parallel on the same traverse axis relative to the vehicle on which they're disposed. It is noted that angular displacements $\chi$, are usually smaller than angular displacements $\delta$, when wheel axles 508 and 510 are longer than output axles 523 and 525.

Figure 6:
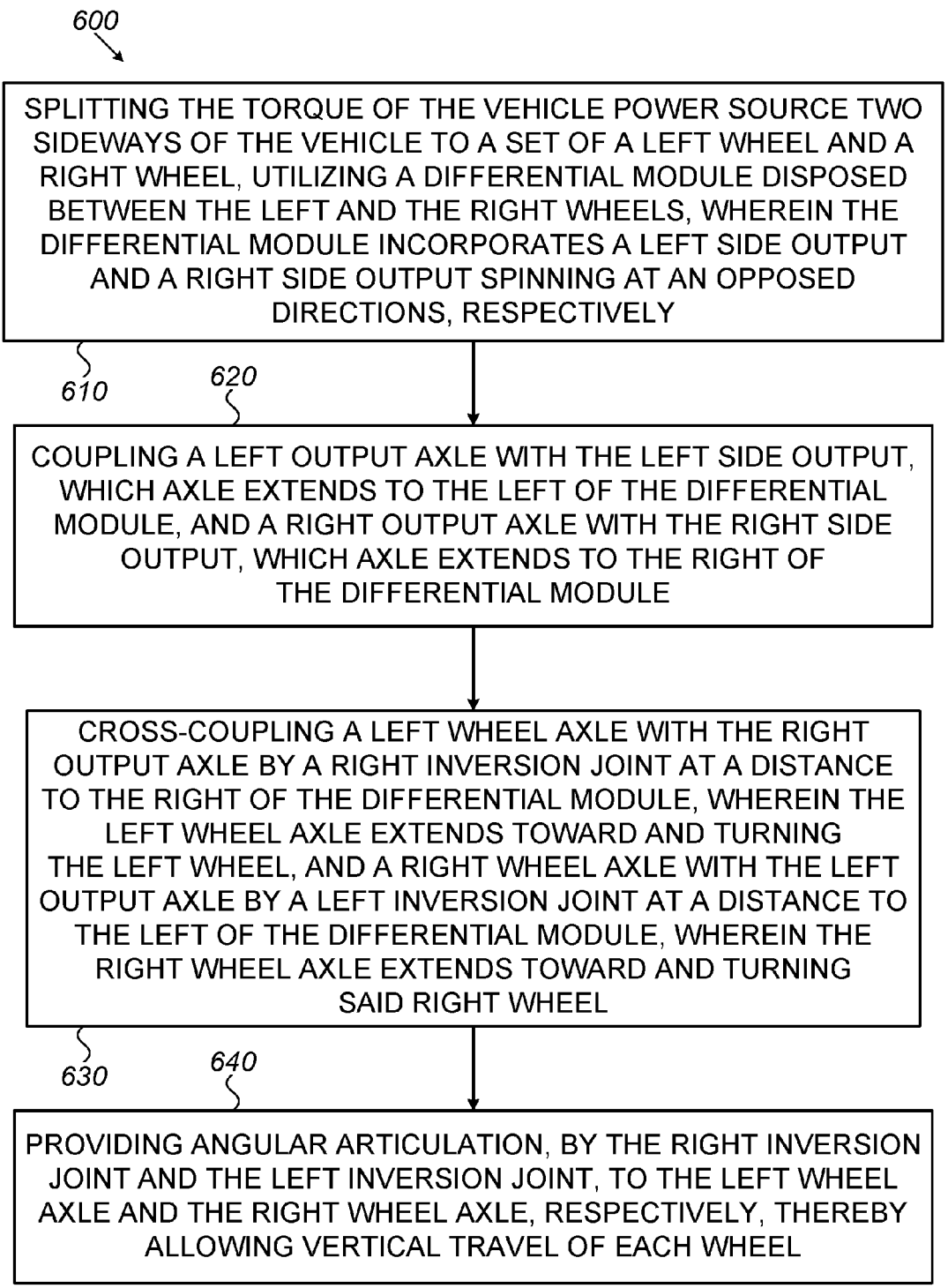
FIG. 6 is a block diagram of a method for increasing vertical wheel travel for a vehicle, operative in accordance with a further embodiment of the disclosed technique.

Reference is now made to FIG. 6, which is a block diagram of a method 600 for increasing the limits of vertical wheel travel for a vehicle, operative in accordance with a further embodiment of the disclosed technique. Method 600 is directed at increasing vertical wheel travel for a vehicle having a set of wheels, a left wheel and a right wheel, wherein the wheels are driven by the power source of the vehicle and supported by respective independent left and right suspensions allowing vertical travel of each wheel. In reference to FIG. 2, a set of left wheel 104 and right wheel 106, wherein wheels 104 and 106 are driven by a power source of the vehicle and supported by respective independent left suspension 26 and right suspension 28, allow vertical travel H of each wheel 104 and 106.

In procedure 610, the torque of the vehicle power source is split two ways to opposite sides of the vehicle, to the set of a left wheel and a right wheel, utilizing a differential module disposed between the left wheel and the right wheel, the differential module including a left side output and a right side output, the outputs spinning at opposed directions, respectively. In reference to FIG. 2, the torque of the vehicle power source is split two ways to opposite sides of the vehicle, to the set of left wheel 104 and right wheel 106, utilizing differential module 102 disposed between left wheel 104 and right wheel 106, wherein differential module 102 includes left side output 120 and right side output 121, the outputs spinning at opposed directions, respectively In procedure 620, coupling a left output axle with the left side output, so the left output axle extends to the left of the differential module, and a right output axle with the right side output, so the right output axle extends to the right of the differential module, is performed. In reference to FIG. 2, left output axle 123 is coupled with left side output 120, so the left output axle 123 extends to the left of differential module 102, and right output axle 125 is coupled with right side output 121, so the right output axle 125 extends to the right of differential module 102.

In procedure 630, a left wheel axle is cross-coupled with the right output axle by a right inversion joint at a distance to the right of the differential module, the left wheel axle extending toward and turning the left wheel, and a right wheel axle with the left output axle by a left inversion joint at a distance to the left of the differential module, the right wheel axle extending toward and turning the right wheel. In reference to FIG. 2, left wheel axle 108 is cross-coupled with right output axle 125 by right inversion joint 140 at a distance to the right of differential module 102, left wheel axle 108 extends towards and turns left wheel 104, and right wheel axle 110 is cross-coupled with left output axle 123 by left inversion joint 142 at a distance to the left of differential module 102, and right wheel axle 110 extends towards and turns right wheel 106. It is noted that left and right wheel axles usually connect to the wheels via a CV joint, such as CV joints 105 and 107 of FIG. 2, for maintaining the wheels in a vertical angle relative to the ground, and allowing the wheel axles to change length (or by providing the CV joints with a variable length) as they travel up and down. Accordingly, the term 'wheel axle' includes a CV joint that connects the wheel axle to the wheel.

In procedure 640, angular articulation is provided by the right inversion joint and the left inversion joint, to the left wheel axle and the right wheel axle, respectively, thereby allowing vertical travel of each wheel. In reference to FIG. 2, angular articulation of up to an angle $\alpha$, is provided by right inversion joint 140 and left inversion joint 142, to left wheel axle 108 and right wheel axle 110, respectively, thereby allowing an increased limit of vertical travel of each wheel, as compared to that provided by those of the prior art.

It will be appreciated by persons skilled in the art that the disclosed technique is not limited to what has been particularly shown and described hereinabove.

While certain embodiments of the disclosed subject matter have been described, so as to enable one of skill in the art to practice the present invention, the preceding description is intended to be exemplary only. It should not be used to limit the scope of the disclosed subject matter, which should be determined by reference to the following claims.

The invention claimed is:

1. A vehicle differential inversion assembly for splitting the torque of said vehicle's power source two ways to opposite sides of said vehicle, to a set of a left wheel and a right wheel supported by respective independent left and right suspensions allowing vertical travel of each wheel, the assembly comprising:
   a differential module for splitting said torque two ways, said differential module disposed between said left wheel and said right wheel, said differential module comprising a left side output and a right side output, said outputs spinning at opposed directions;
   a left output axle coupled with said left side output and extending to the left of said differential module;
   a right output axle coupled with said right side output and extending to the right of said differential module;
   a left wheel axle cross-coupled with said right side output axle by a right inversion joint disposed at a distance to the right of said differential module, the left wheel axle extending towards and turning said left wheel; and
   a right wheel axle cross-coupled with said left output axle by a left inversion joint disposed at a distance to the left of said differential module, the right wheel axle extending towards and turning said right wheel;
   wherein said right inversion joint and said left inversion joint provide angular articulation of said left wheel axle and said right wheel axle, respectively, thereby allowing vertical travel of each said wheel.

2. The differential inversion assembly of claim 1, wherein said left inversion joint and said right inversion joint comprise continuous velocity rotation (CV) joints.

3. The differential inversion assembly of claim 1, wherein said left side output and said right side output comprise CV joints.

4. The differential inversion assembly of claim 1, wherein one of said left side output and said right side output is longitudinally displaced toward the rear or the front of said vehicle with respect to the other one of said left side output and said right side output.

5. The differential inversion assembly of claim 1, wherein one of said left inversion joint and said right inversion joint is longitudinally displaced toward the rear or the front of said vehicle with respect to the other one of said left inversion joint and said right inversion joint.

6. The differential inversion assembly of claim 1, wherein said left output axle and said right output axle extend at opposing lateral angular displacements such that said right inversion joint and said left inversion joint are longitudinally displaced with respect to one another.

7. The differential inversion assembly of claim 1, wherein said right wheel axle and said left wheel axle are disposed at opposing lateral angular displacements compensating for longitudinal displacement of at least one of: said side outputs, said output axles, and said inversion joints, such that said set of wheels are positioned on the same longitudinal disposition.

8. The differential inversion assembly as in claim 1, wherein at least one of: said left side output and said right side output; and said left inversion joint and said right inversion joint, comprise CV joints selected from the list consisting of:
   a universal joint;
   a Tracta joint;
   a Rzeppa joint;
   a Weiss joint;
   a Tripod joint;
   a double Cardan joint;
   a Thompson coupling (Thompson constant velocity joint-TCVJ); and
   a Malpezzi joint.

9. The differential inversion assembly of claim 1, wherein said differential module includes a differential selected from the list consisting of:
   an open differential;
   a limited slip differential (LSD);
   a clutch-type limited slip differential (LSD);
   a viscous coupling;
   a locking differential; and
   a torque-sensing limited slip differential (LSD).

10. A method for increasing vertical wheel travel for a vehicle having a set of a left wheel and a right wheel, the wheels being driven by the power source of said vehicle and supported by respective independent left and right suspensions allowing vertical travel of each wheel, the method comprising the procedures of:
   splitting the torque of the vehicle power source two ways to opposite sides of said vehicle, to said set of a left wheel and a right wheel, utilizing a differential module disposed between said left wheel and said right wheel, the differential module comprising a left side output and a right side output, said outputs spinning at opposed directions;
   coupling a left output axle with said left side output, said left output axle extending to the left of said differential module, and coupling a right output axle with said right side output, said right output axle extending to the right of said differential module;
   cross-coupling a left wheel axle with said right output axle by a right inversion joint at a distance to the right of said differential module, said left wheel axle extending towards and turning said left wheel, and cross-coupling a right wheel axle with said left output axle by a left inversion joint at a distance to the left of said differential module, said right wheel axle extending towards and turning said right wheel; and providing angular articulation, by said right inversion joint and said left inversion joint; to said left wheel axle and said right wheel axle, respectively, thereby allowing vertical travel of each wheel.

11. The method of claim 10, wherein said step of splitting further comprises longitudinally displacing one of said left side output and said right side output towards the rear or the front of said vehicle with respect to the other one of said left side output and said right side output.

12. The method of claim 10, wherein said step of cross-coupling further comprises longitudinally displacing one of said left inversion joint and said right inversion joint towards the rear or the front of said vehicle with respect to the other one of said left inversion joint and said right inversion joint.

13. The method of claim 10, wherein said step of coupling further comprises extending said left output axle and said right output axle at opposing lateral angular displacements such that said right inversion joint and said left inversion joint are longitudinally displaced with respect to one another.

14. The method of claim 10, wherein said step of cross-coupling further comprises disposing said right wheel axle and said left wheel axle at opposing lateral angular displacements such that said set of wheels are positioned on the same longitudinal disposition thereby compensating for the longitudinal displacement of said side outputs, output axles, or inversion joints.

* * * * *